United States Patent
Park

(10) Patent No.: US 8,307,733 B2
(45) Date of Patent: Nov. 13, 2012

(54) TILTING AND TELESCOPIC STEERING APPARATUS

(75) Inventor: Jung Sik Park, Wonju-si (KR)

(73) Assignee: Mando Corporation, Pyeongtaek-Si (KR)

( * ) Notice: Subject to any disclaimer, the term of this patent is extended or adjusted under 35 U.S.C. 154(b) by 529 days.

(21) Appl. No.: 12/556,078

(22) Filed: Sep. 9, 2009

(65) Prior Publication Data

US 2009/0314121 A1  Dec. 24, 2009

Related U.S. Application Data

(63) Continuation-in-part of application No. 11/784,957, filed on Apr. 9, 2007, now abandoned.

(30) Foreign Application Priority Data

May 9, 2006 (KR) .................................. 2006-41714

(51) Int. Cl.
    *B62D 1/18* (2006.01)
(52) U.S. Cl. .......................................... 74/493; 74/492
(58) Field of Classification Search ............ 74/493, 74/492
    See application file for complete search history.

(56) References Cited

U.S. PATENT DOCUMENTS

| | | | |
|---|---|---|---|
| 4,656,887 A | | 4/1987 | Yoshida |
| 5,531,317 A | * | 7/1996 | Tomaru .......................... 280/775 |
| 5,722,299 A | | 3/1998 | Yamamoto et al. |
| 2007/0204714 A1 | | 9/2007 | Lutz |
| 2009/0020995 A1 | | 1/2009 | Kim |

FOREIGN PATENT DOCUMENTS

| | | |
|---|---|---|
| DE | 102004018902 B3 | 1/2006 |
| JP | 2005-112105 | 4/2005 |

OTHER PUBLICATIONS

Japanese Office Action for Application No. 2007-116086, dated Jul. 22, 2009.

* cited by examiner

*Primary Examiner* — Troy Chambers
*Assistant Examiner* — Terence Boes
(74) *Attorney, Agent, or Firm* — McDermott Will & Emery LLP

(57) ABSTRACT

A tilting and telescopic apparatus is provided. The apparatus includes a column housing surrounding a steering shaft, a telescopic tube coupled, on a first end, to the column housing, a telescopic bracket surrounding a second end of the telescopic tube so as to slidably move along the telescopic tube, a tilt shaft provided in the telescopic bracket, a tilt bracket rotatably coupled to the tilt shaft, an adjusting bolt passing through one side of the telescopic bracket and the tilt bracket, a cam provided on one end of the adjusting bolt, an adjusting lever driving the cam, and a tilt locking member provided on the other end of the adjusting bolt. In the apparatus, no cable is necessary and the adjusting lever is provided on the telescopic bracket, thereby smoothing the tilting and telescoping operations thereof.

5 Claims, 4 Drawing Sheets

TILTING AND TELESCOPIC STEERING APPARATUS

CROSS REFERENCE TO RELATED APPLICATIONS

This application is a continuation-in-part of application Ser. No. 11/784,957, filed Apr. 9, 2007, and claims priority therefrom which in turn claims priority from Korean Patent Application No. 2006-41714 filed May 9, 2006, which are both incorporated by reference.

TECHNICAL FIELD

The present disclosure relates to a tilting and telescopic steering apparatus, and more particularly to a tilting and telescopic steering apparatus in which a cable is removed and an adjusting lever is provided on a telescopic bracket, thereby smoothing the tilting and telescoping operations thereof, and allowing the adjusting lever not to move relative to a shroud cover.

BACKGROUND OF THE DISCLOSURE

FIG. 1 is a partial side view of a conventional tilting and telescopic steering apparatus.

As shown in FIG. 1, the conventional tilting and telescopic steering apparatus includes a steering shaft 101 connected to a steering wheel (not shown), a column housing 103 surrounding the steering shaft 101, a telescopic tube 105 slidably coupled to the rear side of the column housing 103, a telescopic bracket 107 coupled to the rear side of the telescopic tube 105, a tilt bracket 109 rotatably coupled to one side of the telescopic bracket 107, a shroud cover 111 surrounding the tilt bracket 109, an adjusting lever 113 provided on one side of the column housing 103, a fixing part 115 provided on one side of the tilt bracket 109, and a cable 117 connecting the adjusting lever 113 and the fixing part 115 to each other.

The steering shaft 101 consists of an upper shaft 101a and a lower shaft 101b connected with each other via an universal joint (not shown), wherein the upper shaft 101a is built in the tilt bracket 109 and the lower shaft 101b is built in the column housing 103.

The tilt bracket 109 is rotatably coupled to the telescopic bracket 107 via a tilt shaft 119, and the centers of rotation in the upper shaft 101a and the tilt bracket 109 coincide with that of the tilt shaft 119. Thus, upon the tilting operation by an operator, the upper shaft 101a and the tilt bracket 109 are concentrically rotated.

Meanwhile, the operation of the adjusting lever 113 releases the contact state between the column housing 103 and the telescopic tube 105 and the locking state of the fixing part 115, so that the operator can freely adjust the tilting and telescoping operations. This is because the cable 117 connected to the adjusting lever 113 is also connected to the fixing part 115 so that the driving force of the adjusting lever 113 is transferred to the fixing part 115.

However, the conventional apparatus having the above construction has following problems.

A first problem is that since the adjusting lever 113 is provided on the column housing 103 while being separated from the tilt bracket 109, when upon tilt adjusting, the shroud cover 111 rotates together with the tilt bracket 109, a gap between a grip of the adjusting lever 113 and the shroud cover 111 does not maintain constant.

A second problem is that if the cable 117 to link the adjusting lever 113 with the fixing part 115 were improperly set, the tilting and the telescoping operations are not properly achieved. Additionally, extra parts are required for installing the cable 117.

DISCLOSURE OF THE INVENTION

Accordingly, the present disclosure has been made to solve the above-mentioned problems occurring in the prior art, and the present disclosure provides a tilting and telescopic steering apparatus in which a cable is removed and an adjusting lever is provided to a telescopic bracket, thereby smoothing the tilting and telescoping operations thereof and allowing the adjusting lever not to move relative to a shroud cover.

In order to accomplish the above object, in accordance with an aspect of the present disclosure, there is provided a tilting and telescopic steering apparatus comprising: a column housing surrounding a steering shaft; a telescopic tube coupled, on a first end, to the column housing; a telescopic bracket surrounding a second end of the telescopic tube so as to slidably move along the telescopic tube; a tilt shaft provided in the telescopic bracket; a tilt bracket rotatably coupled to the tilt shaft so that the tilt bracket is rotated relative to the tilt shaft; an adjusting bolt provided in parallel with the tilt shaft and passing through one side of the telescopic bracket and the tilt bracket; a cam provided on one end of the adjusting bolt and contacting a circumferential face of the telescopic bracket; an adjusting lever driving the cam to move the adjusting bolt in an axial direction; and a tilt locking member provided on the other end of the adjusting bolt, the tilt locking member including a first mesh part on the telescopic bracket and a second mesh part on the adjusting bolt, the first mesh part being engaged with the second mesh part by a first axial movement of the adjusting bolt to lock the telescopic bracket and the telescopic tube, the second mesh part being separated from the first mesh part by a second axial movement of the adjusting bolt to unlock the telescopic bracket and the telescopic tube.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
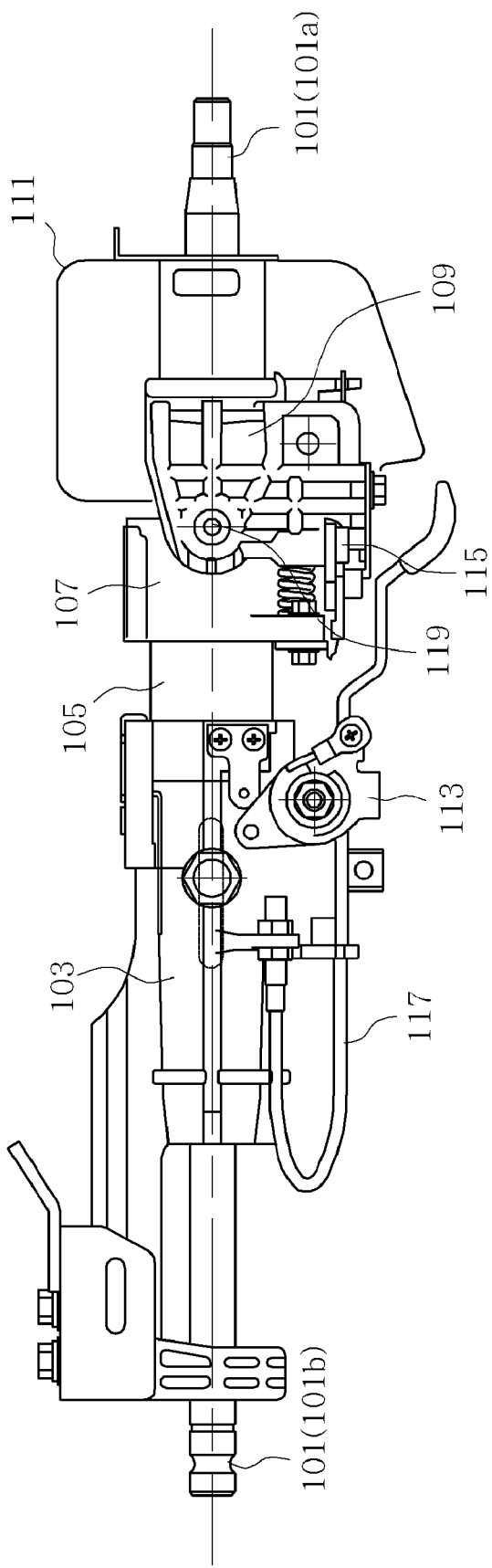
FIG. 1 is a partial side view of a conventional tilting and telescopic steering apparatus.

Hereinafter, an exemplary embodiment of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Figure 2:
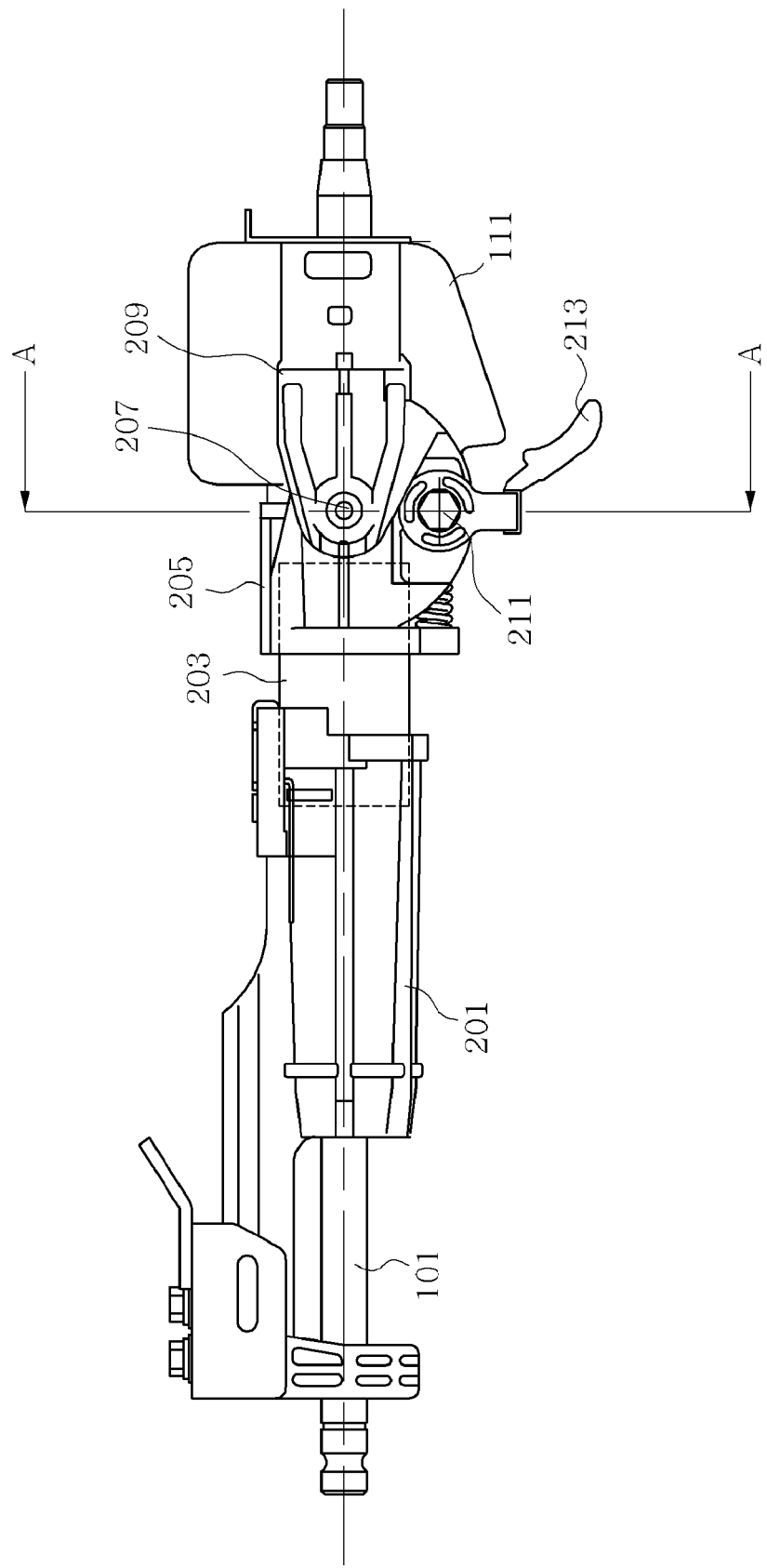
FIG. 2 is a partial side view of a tilting and telescopic steering apparatus according to a preferred embodiment of the present disclosure.
Figure 3:
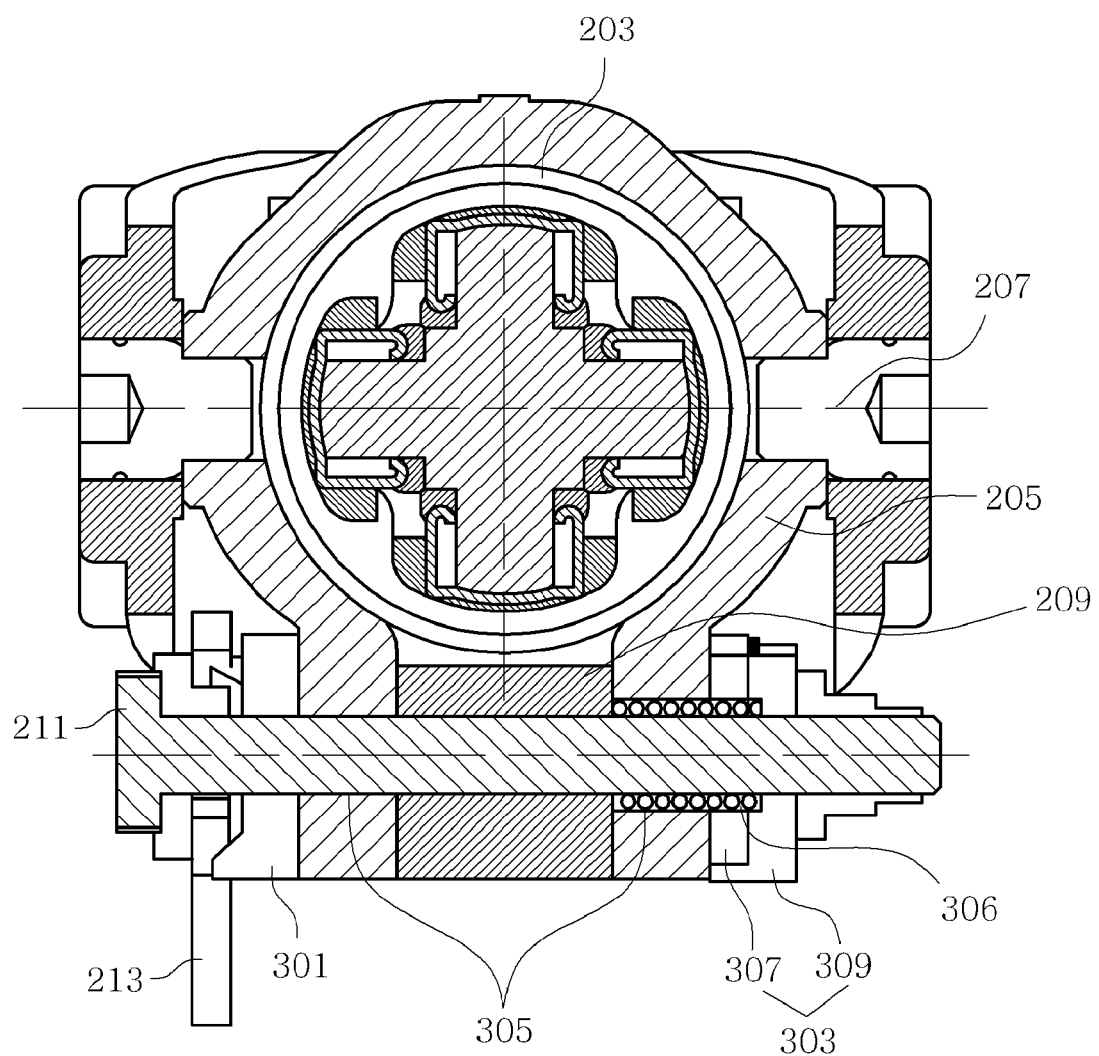
FIG. 3 is a sectional view taken along a line A-A of FIG. 2.
Figure 4:
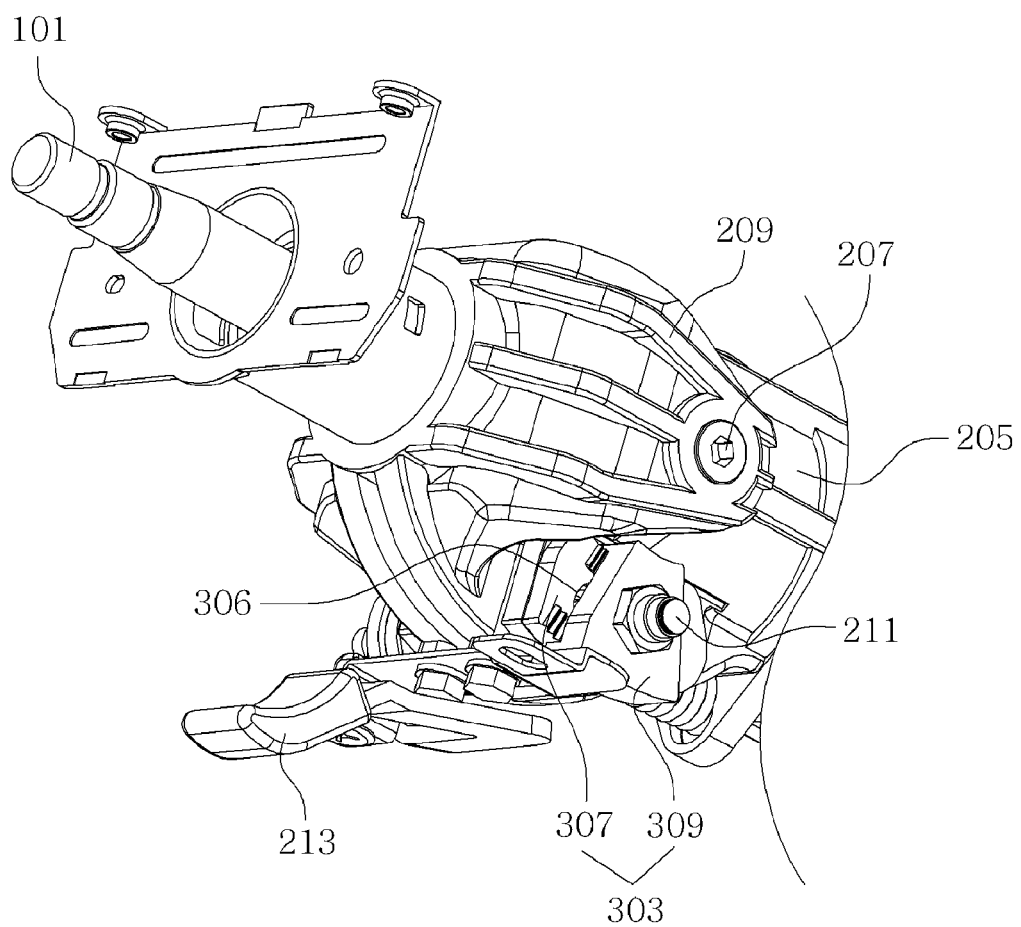
FIG. 4 is a partial perspective view of the tilting and telescopic steering apparatus according to the preferred embodiment of the present disclosure.

FIG. 2 is a partial side view of a tilting and telescopic steering apparatus according to a preferred embodiment of the present disclosure, FIG. 3 is a sectional view taken along a line A-A of FIG. 2, and FIG. 4 is a partial perspective view of the tilting and telescopic steering apparatus according to the preferred embodiment of the present disclosure.

As shown in FIGS. 2 and 3, the tilting and telescopic apparatus includes a column housing 201 surrounding a steering shaft 101, a telescopic tube 203 coupled, on a first end, to the column housing 201, a telescopic bracket 205 surrounding a second end of the telescopic tube 203 so as to slidably move along the telescopic tube 203, a tilt shaft 207 provided in the telescopic bracket 205, a tilt bracket 209 rotatably coupled to the tilt shaft 207, an adjusting bolt 211 passing through one side of the telescopic bracket 205 and the tilt bracket 209, a cam 301 provided on one end of the adjusting bolt 211, an adjusting lever 213 driving the cam 301, and a tilt locking member 303 provided on the other end of the adjusting bolt 211.

The telescopic tube 203 is coupled, on the first end, to the column housing 201 and surrounds the steering shaft 101.

The telescopic bracket 205 surrounds the second end of the telescopic tube 203 so as to slidably move along the telescopic tube 203, thereby enabling the control of the telescoping operations.

The telescopic bracket 205 is provided, on its middle portion, with the tilt shaft 207, to which the tilt bracket 209 is rotatably coupled. In addition, a shroud cover 111 is provided around the circumference of the tilt bracket 209 to surround the same. Since the tilt bracket 209 is rotated about the tilt shaft 207, the steering wheel can be controllably tilted.

The adjusting bolt 211 passes through the outer circumference of the telescopic bracket 205. The adjusting bolt 211 has, on its one end, the cam 301 and the adjusting lever 213, and has, on the other end, the tilt locking member 303.

The adjusting bolt 211 is provided in parallel with the tilt shaft 207 such that it passes through the telescopic bracket 205 and the tilt bracket 209. Since the middle portion of the adjusting bolt 211 is fixedly coupled to the tilt bracket 209, upon controlling the tilt, the adjusting bolt 211 is rotated together with the tilt bracket 209. In addition, the adjusting bolt 211 passes through a slot 305 provided on the telescopic bracket 205, the slot having a sectional shape of an arc of a circle about the tilt shaft 207, so that upon controlling the tilt, the adjusting bolt 211 is rotated along the slot 305.

The cam 301 provided on one end of the adjusting bolt 211 is provided so as to be in contact with the circumferential face of the telescopic bracket 205, and is operated with the rotation of the adjusting lever 213, causing the adjusting bolt 211 to move in its own axial directions.

Meanwhile, as shown in FIG. 4, the adjusting bolt 211 is provided, on the other end thereof, with the tilt locking member 303, which includes a stationary mesh part 307 with teeth fixed to the telescopic bracket 205 and a movable mesh part 309 with teeth engaged with the stationary mesh part 307. Similar to the telescopic bracket 205, the stationary mesh part 307 is provided inside with a slot 306, through which the adjusting bolt 211 passes, and the movable mesh part 309 is coupled and fixed to the adjusting bolt 211.

The operation of the tilting and telescopic steering apparatus according to the preferred embodiment of the disclosure will be hereinafter explained in detail.

First, when an operator wants to control the tilting and telescoping operations, he/she rotates the adjusting lever 213 in one direction, so that the cam 301 is operated with the rotation of the adjusting lever 213, allowing the adjusting bolt 211 to move axially.

In case where the movable mesh part 309 is separated from the stationary mesh part 307 with the axial movement of the adjusting bolt 211, that is, when the tilt locking member 303 is unlocked, the engagement between the telescopic bracket 205 and the telescopic tube 203 comes to be loose.

Thus, the operator can control the degree of protruding and inclination of the steering shaft 101. After the completion of such control of the tilting and telescoping operations, the operator rotates the adjusting lever 213 in a counter-direction to restore the locking state of the tilt locking member 303 and to loose the contact state between the telescopic bracket 205 and the telescopic tube 203.

According to the tilting and telescopic steering apparatus of the preferred embodiment having the above construction, the adjusting lever 213 is provided on the telescopic bracket 205 and the adjusting bolt 211 rotates with the tilt bracket 209, so that even upon controlling the tilt, the gap between the grip of the adjusting lever 213 and the shroud cover 111 is maintained constant. Thus, the prior problem of the gap inconstancy at every tilt control can be solved.

In addition, according to the tilting and telescopic steering apparatus of the preferred embodiment, the tilt locking member 303, and therefore the telescopic bracket 205 and the telescopic tube 203, are locked or unlocked along with rotation of the adjusting lever 213 without using a separate cable, so that separate additional parts are not required, which resolves the prior problem of malfunction due to failure of cable control.

As set forth before, according to the present disclosure, the adjusting lever provided on the telescopic bracket obviates the need for the cable, thereby smoothing the tilting and telescoping operations thereof.

Although an exemplary embodiment of the present disclosure has been described for illustrative purposes, those skilled in the art will appreciate that various modifications, additions and substitutions are possible, without departing from the scope of the disclosure as disclosed in the accompanying claims. The scope of the claims, therefore, should be accorded the broadest interpretation so as to encompass all such modifications, similar arrangements and equivalents.

What is claimed is:

1. A tilting and telescopic steering apparatus, comprising:
a column housing surrounding a steering shaft;
a telescopic tube coupled, on a first end thereof, to the column housing;
a telescopic bracket surrounding a second end of the telescopic tube so as to slidably move along the telescopic tube;
a tilt shaft provided in the telescopic bracket;
a tilt bracket rotatably coupled to the tilt shaft so that the tilt bracket is rotated relative to the tilt shaft;

an adjusting bolt provided in parallel with the tilt shaft and passing through one side of the telescopic bracket and the tilt bracket;

a cam provided on one end of the adjusting bolt and contacting a circumferential face of the telescopic bracket;

an adjusting lever driving the cam to move the adjusting bolt in an axial direction, such that a rotation of the adjusting lever along the axial direction in a first direction allows for a first axial movement of the adjusting bolt, and a rotation of the adjusting lever along the axial direction in a second direction counter to the first direction allows for a second axial movement of the adjusting bolt; and a tilt locking member provided on the other end of the adjusting bolt, the tilt locking member including a first mesh part on the telescopic bracket and a second mesh part on the adjusting bolt, the first mesh part being engaged with the second mesh part by the first axial movement of the adjusting bolt to lock the telescopic bracket and the telescopic tube, the second mesh part being separated from the first mesh part by the second axial movement of the adjusting bolt to unlock the telescopic bracket and the telescopic tube.

2. The tilting and telescopic steering apparatus according to claim 1, wherein the telescopic tube is integrally formed with the column housing.

3. The tilting and telescopic steering apparatus according to claim 2, wherein the telescopic bracket is provided with a slot through which the adjusting bolt passes.

4. The tilting and telescopic steering apparatus according to claim 1, wherein a middle portion of the adjusting bolt is fixed to the tilt bracket so that the adjusting bolt moves along with the tilt bracket.

5. The tilting and telescopic steering apparatus according to claim 1, wherein the adjusting lever is provided on the telescopic bracket.

* * * * *